Nov. 10, 1970 S. J. SCHWARTZ 3,540,020

MAGNETIC STORAGE DEVICE HAVING A RIPPLED MAGNETIZATION PATTERN AND PERIODIC EDGE DISCONTINUITIES

Filed April 3, 1967

INVENTOR
SIDNEY J. SCHWARTZ

BY Louis A. Kline
John J. Callahan
Glenn W. Bowes

HIS ATTORNEYS

United States Patent Office
3,540,020
Patented Nov. 10, 1970

3,540,020

MAGNETIC STORAGE DEVICE HAVING A RIPPLED MAGNETIZATION PATTERN AND PERIODIC EDGE DISCONTINUITIES

Sidney J. Schwartz, Dayton, Ohio, assignor to The National Cash Register Company, Dayton, Ohio, a corporation of Maryland Filed Apr. 3, 1967, Ser. No. 627,820
Int. Cl. G11c *11/14, 5/02*
U.S. Cl. 340—174 6 Claims

ABSTRACT OF THE DISCLOSURE

Magnetic storage devices consisting of narrow strips of thin magnetic film material having an established stable rippled magnetization pattern are disclosed in which adjacent magnetization vectors are displaced alternately in a clockwise direction and a counter-clockwise direction. The periodic reproducibility of the magnetic domains that create the rippled magnetization pattern of the present disclosed invention is enhanced by introducing periodic discontinuities along the edges of the thin magnetic film strips.

Magnetic storage devices according to the disclosed invention may be formed by etching narrow magnetic film strips from an anisotropic thin magnetic film sheet, so that the etched strips run parallel to the original hard direction of magnetization of the anisotropic material, by depositing strips of a magnetic material having a high coercivity on an anisotropic thin magnetic film sheet in the original hard direction of magnetization of the sheet or by depositing thin film magnetic strips in the presence of a magnetic orientating field which tends to induce an anisotropic magnetization across the narrow dimension of the strip. The resulting magnetic storage devices are suitable for operation in an incoherent rotational switching mode.

BACKGROUND OF THE INVENTION

British Pat. No. 1,021,556 discloses magnetic film storage devices which employ rippled magnetization patterns. The present invention improves the periodic reproducibility of the rippled magnetization patterns of thin magnetic film strip storage devices.

TECHNICAL DESCRIPTION OF THE INVENTION

The magnetic storage device of the disclosed invention consists of a narrow strip of thin magnetic film material in which magnetic storage may be achieved by alignment of the magnetization of the strip in a general longitudinal direction in a rippled pattern, one direction along the strip being used to store a "1," and the opposite direction along the strip being used to store a "0." The rippled domain pattern required for the present invention is a function of the width-to-thickness ratio of the magnetic strip and of the anisotropic energy factor of the narrow dimension of the strip. The length of the strip is also a factor, in that de-magnetization domains arise at the ends of a flat magnetic strip in the longitudinal direction. This requires that the length of flat magnetic strips of the present invention be somewhat greater than their width to provide sufficient usable central storage areas. If the strip is closed upon itself, de-magnetization at the ends of the strip is eliminated, thereby allowing for greater packing density of memory devices.

The width-to-thickness ratio of various embodiments of the disclosed invention can be as large as 1600 to 1. Somewhat larger width-to-thickness ratios will produce operable embodiments of the present invention, depending on the anisotropic energy factor but if the width-to-thickness ratio is substantially increased, as by an order of magnitude, for example, two satisfactory stable storage states along the longitudinal direction of the strip will no longer be obtained. The storage states of "0" and "1" occur in the storage device of the present invention when the rippled domain pattern is oriented generally in one direction along the longitudinal dimension of the strip, and they are minimum energy states. Thus, a magnetic storage device, according to the invention, has two stable magnetization states, which are separated by a relatively high energy barrier. As the width-to-thickness ratio increases, the energy barrier which separates the two minimum energy storage states decreases to the extent that two stable storage states are no longer obtainable.

Figure 1:
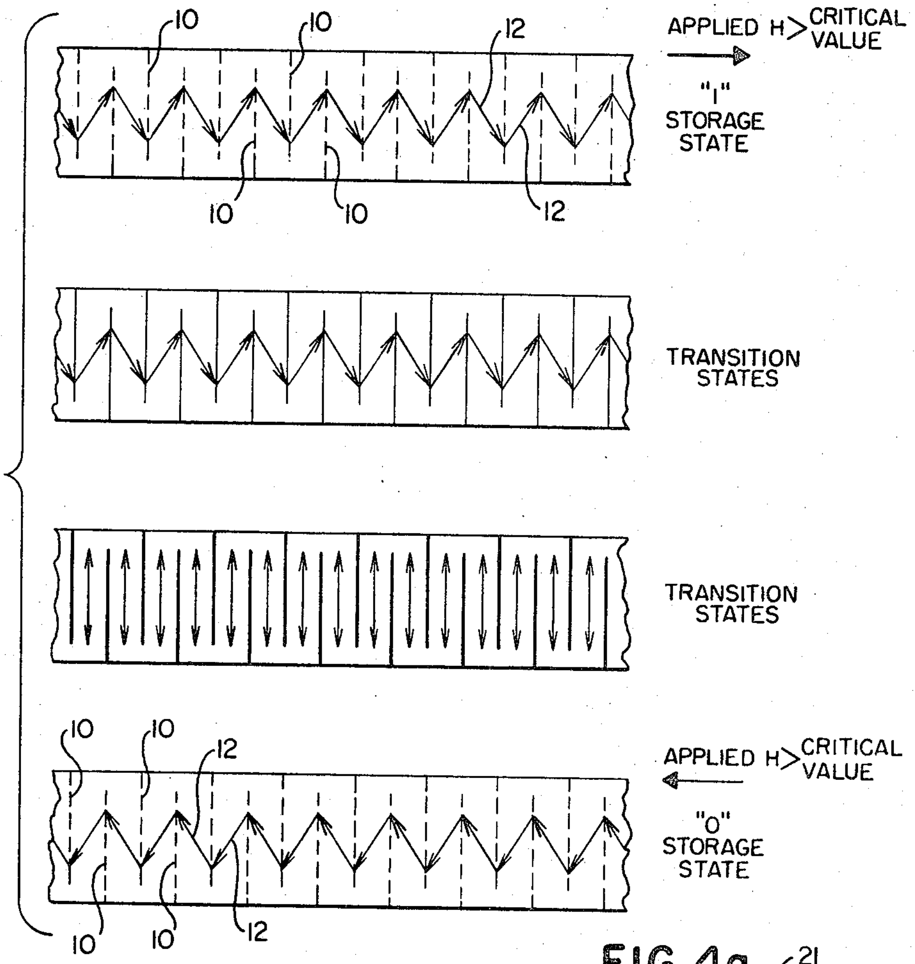
FIG. 1 is a diagrammatic illustration of the rippled magnetization pattern of a magnetic storage device of the present invention.

FIG. 1 illustrates the rippled magnetization pattern of the magnetic storage device of the disclosed invention. These patterns are formed by placing a thin anisotropic magnetic film strip in a hard direction magnetic field that has a magnitude greater than an experimentally-determinable critical switching field. The critical switching field is normally somewhat greater than the anisotropic field strength $H_k$. The applied magnetization field is then reduced below the critical switching field, and a plurality of elongated, parallel domain walls 10 are formed with an orientation in the initial easy direction of magnetization of the anisotropic magnetic material. Closure domains will appear if the anisotropy constant of the magnetic material is low, but will not form if the anisotropy constant is high or the film is very thin. The magnetization vector 12 in each of these domains is turned alternately clockwise and counter-clockwise. Thus a "rippled" domain pattern results in the magnetic storage strip of FIG. 1.

Anisotropic magnetic films of 81% nickel and 19% iron with a thickness of 800 angstrom units and initial film constants of $H_c$=3.0 oersteds and $H_k$=3.8 oersteds and with a width of from 1 mil to 5 mils, and lengths that are several times larger than the width of the strip, have been employed in the present invention. These films were prepared by vacuum deposition on a glass substrate to provide uniform composition and magnetic properties. The surface of the glass substrate was highly polished and was heated during deposition. It was found that $H_c$ varies from about 2 oersteds at a substrate temperature of 220 degrees centigrade to about 4 oersteds at a substarate temperature of 280 degrees centigrade, while $H_k$ remains substantially constant over this range of substrate temperatures. The preferred films were obtained with a glass substrate temperature of approximately 250 degrees centigrade and a vacuum deposition pressure of approximately $0.5\times10^{-7}$ torr. The dispersion and skew of the preferred magnetic films were less than 3 degrees over a substrate area of 2 inches by 3 inches. Aluminum and copper substrates are also suitable for the preferred magnetic films of the present invention. A silicon monoxide overcoating layer is necessary over a copper substrate to prevent diffusion of the copper into the thin magnetic film and to enhance substrate smoothness.

A glass substrate of good surface finish qualities may be employed without polishing. For example, glass of microscope quality may be employed as a substrate without polishing. In any case, polishing improves the magnetic uniformity of the deposited magnetic film and is recommended. Following the polishing step, the glass is cleaned by any standard cleaning process employed in the art. Deposition is then carried out by standard vapor deposition techniques on the glass substrate, which is preferably heated.

It is to be emphasized that the particular manner of fabricating the anisotropic magnetic film is not a limitation of the present invention. In particular, the thin anisotropic magnetic film may be formed on magnetic films other than nickel-iron alloy films. The anisotropic magnetic films may also be prepared by electrodeposition, by chemical deposition, by sputtering, and even by epitaxial growth out of a gaseous phase as well as by vacuum deposition. A large number of substrates other than glass may be employed. For example, glazed ceramics, polished metals including copper, beryllium copper, Phosphor bronze, brass, aluminum, and other metals that are coated with a silicon monoxide overcoating layer may also be employed.

The thin film strips of magnetic material may be formed from the thin film sheet of anisotropic thin magnetic film sheet by an etching process. The etchant used is a 5% water solution of ferric chloride. A dilute etchant is preferred, so as to obtain a more precise control over the etching process. Dilute hydrochloric or nitric acid may also be used for etching the strip.

To obtain good line resolution during the etching process, a standard photoresist layer is applied to mask those areas of the sheet that correspond to the strips required.

The film substrate is placed in a centrifugal device, so as to achieve a thin, evenly-distributed layer of photoresist over the thin film substrate. The photoresist is then removed in alternate stripes, and the etching is performed. An additional deposition step may be performed by sputtering, chemical deposition, plating, or other methods to form thin lines along the edge of the etched strip to thereby reduce the effective edge roughness of the etched strips. When a sputtering or vacuum deposition method is employed to form the thin edge lines, raising of the evaporation mask slightly off the film substrate leads to a contoured edge, which reduces the rate of thickness change at the edge of the thin magnetic strips, thereby improving the uniformity of the rippled magnetic domain pattern of the storage device.

Good line resolution is essential in the etching process if no additional processing of the remaining magnetic strips is to be undertaken. Edge roughness of the magnetic strips causes a disruption of the rippled domain structure and leads to a number of stray domains and subsequent minor hysteresis loops which impair the performance of the magnetic strip storage element. The edge roughness influence may be reduced by the use of wider strips; however, the required balance between anisotropic energy and magnetostatic energy, which is related to the width-to-thickness ratio of the strip, must be maintained to obtain a device with the desired characteristics.

The magnetic strips of the present invention may also be prepared by electroplating or by chemically plating through a photoresist "window." In such a method of directly forming the magnetic strips, a strong magnetic field in the intended induced easy direction of magnetization must be maintained to obtain the desired induced anisotropy energy factor in the magnetic film strips.

Figure 4A:
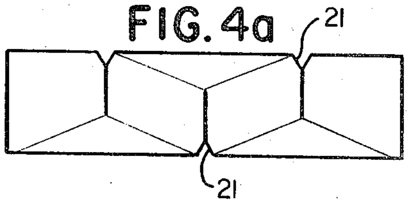
FIG. 4*a* is a top view of a strip embodiment of the present invention having notched edge discontinuities.
Figure 4B:
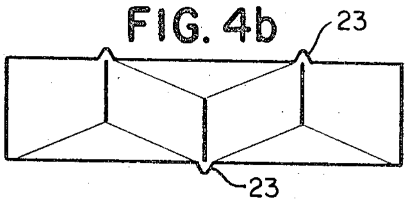
FIG. 4*b* is a top view of a strip embodiment of the present invention having built-up edge discontinuities.

Periodic reproducibility of the desired rippled domain pattern may be enhanced by introducing periodic discontinuities along the edges of a strip. These discontinuities become nucleation sites for the domain walls which are present in the rippled domain devices. These discontinuities may be in the form of small notches 21, as in FIG. 4*a*, or they may be built-up areas 23, as in FIG. 4*b*. Preferably, the discontinuities along one edge are positioned intermediate the discontinuities along the other edge.

The hysteresis characteristics of the thin magnetic film strips that are etched from the initial anisotropic thin magnetic film sheet become increasingly rectangular in the initial direction of magnetization as the width of the thin magnetic film strip is decreased. For example, it was found that, with the film strips of the present invention, a decrease of strip thickness from 5 mils to 1 mil resulted in a hard direction hysteresis characteristic in which the coercivity force increased from about 1.6 oersteds to about 8 oersteds.

Figure 2:
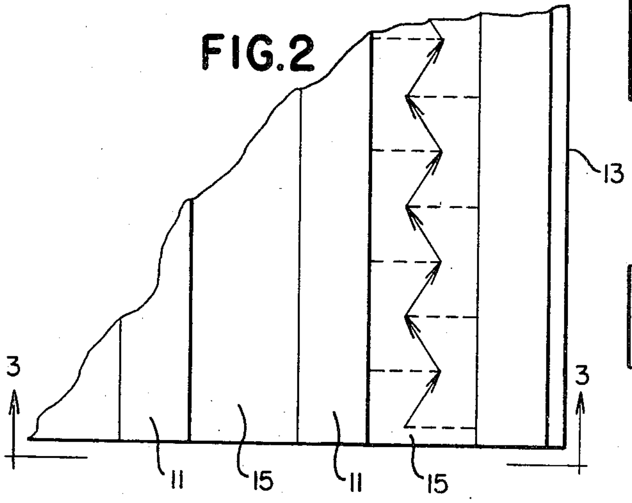
FIG. 2 is a top view of a deposited dual layer film embodiment of the present invention.
Figure 3:
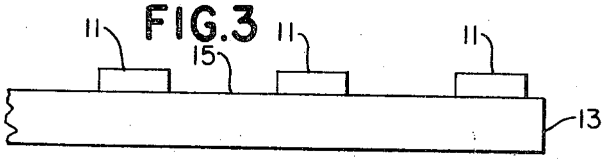
FIG. 3 is a side view of a deposited dual layer film embodiment of the present invention.

The alternate structure of FIGS. 2 and 3 is formed by deposition, sputtering, chemical deposition, plating, or other methods of depositing thin magnetic strips 11 of a high magnetic coercivity material over a thin anisotropic magnetic film sheet of a lower coercivity. The high coercivity material is exchange-coupled to the underlying lower coercivity material, so that the underlying material cannot magnetically switch in the regions which are below the higher coercivity material. In this manner, a number of independent storage strips are formed in the lower coercivity material intermediate the strips 11 of higher coercivity material. The width of the deposited magnetic strips is again determinative of the hysteresis characteristic of the strips 15 in the storage direction of magnetization. The overcoating layer thereby establishes the desired structure by preventing the anisotropic magnetic material below a high coercivity strip 11 from switching. The magnetic storage device of the present invention has two well-defined stable states in the direction that corresponds to the hard direction of magnetization with respect to the induced anisotropy of the magnetic strip, and, therefore, this strip has a high threshold field for irreversible switching. The devices of the present invention, moreover, may also be provided with flux closure in the initial hard direction of magnetization and they will then appear like a toroidal magnetic core with flux closure in the storage direction of magnetization.

The magnetic storage devices of the present invention have a number of advantages. By using narrow strips, the switching threshold ($H_c$) of the element can be controlled by controlling the strip width, thickness, domain density, and induced anisotropy. The narrow strip permits very small storage cells, and thus a high packing density is obtainable. This permits a large memory with short signal and drive pulse propagation times along the access lines. It also permits increased economy in batch fabrication processing, since more cells are obtainable on a single substrate. Thicker coatings may be used, with a resulting increase in signal levels, since the device is much less sensitive to stray fields than are conventional film memories.

A number of separate strips may be used to form one memory cell, and this offers some redundancy in a batch fabricated array, since a catastrophic failure of one strip would not cause a memory cell to fail. Total rotational switching may be obtained with films of higher $H_k$, or a combination of rotational and wall motion can be obtained with materials having a low $H_k$. The device of the present invention may also have either a closed or an open flux structure, but with the closed flux structure the de-magnetization field in the storage direction of magnetization is eliminated, thereby allowing for increased memory density.

Moreover, non-destructive readout is possible when the memory device of the present invention is employed in conventional memory systems.

What is claimed is:

1. A plurality of magnetic storage devices, comprising:

(a) a sheet of anisotropic magnetic film material of a relatively low magnetic coercivity having an initial easy and an initial hard direction of magnetization, and (b) a plurality of parallel strips of a magnetic film material of a relatively high magnetic coercivity disposed on the sheet of anisotropic magnetic film material with an orientation in the initial hard direction of magnetization to form a plurality of storage strips in the anisotropic material intermediate the high coercivity strips, each of the storage strips having both an established stable rippled magnetization pattern, the rippled magnetization pattern being representable by magnetization vectors which are alternately displaced through clockwise and counterclockwise acute angles from the longitudinal direction of the strip, and periodic edge discontinuities along the longitudinal edges of the strip.

2. A device as in claim 1 wherein the edge discontinuities are notches.

3. A device as in claim 2 wherein the edge discontinuities are built-up areas of magnetic material.

4. A device as in claim 1 wherein the edge discontinuities of each edge are positioned intermediate the edge discontinuities of the other edge.

5. A device as in claim 4 wherein the edge discontinuities are notches.

6. A device as in claim 4 wherein the edge discontinuities are built-up areas of magnetic material.

References Cited

UNITED STATES PATENTS

| | | | |
|---|---|---|---|
| 3,016,524 | 1/1962 | Edmunds | 340—174 X |
| 3,113,297 | 12/1963 | Dietrich | 340—174 |
| 3,140,471 | 7/1964 | Fuller | 340—174 |
| 3,438,016 | 4/1969 | Spain | 340—174 |
| 3,432,828 | 3/1969 | Barker et al. | 340—174 |

OTHER REFERENCES

Publication I, IBM Technical Disc. Bull. vol. 9, No. 5, October 1966.

Publication II, IBM Technical Disc. Bull. vol 6, No. 6, November 1963.

BERNARD KONICK, Primary Examiner

S. B. POKOTILOW, Assistant Examiner